United States Patent [19]

Ferreira

[11] Patent Number: 5,204,572
[45] Date of Patent: Apr. 20, 1993

[54] RADIAL MAGNETIC COUPLING

[75] Inventor: Caio A. Ferreira, Rockford, Ill.

[73] Assignee: Sundstrand Corporation, Rockford, Ill.

[21] Appl. No.: 581,759

[22] Filed: Sep. 13, 1990

[51] Int. Cl.⁵ ............................................. H02K 21/12
[52] U.S. Cl. ................................. 310/156; 310/75 D; 335/302; 335/306
[58] Field of Search ................. 310/75 D, 92, 156, 93, 310/105; 464/29, 41; 335/302, 306

[56] References Cited

U.S. PATENT DOCUMENTS

| 3,488,535 | 1/1970 | Baermann | 310/93 |
| 4,120,618 | 10/1978 | Klaus | 310/156 |
| 4,163,914 | 8/1979 | Keyes | 310/103 |
| 4,371,798 | 2/1983 | Kuroda | 310/80 |
| 4,486,678 | 12/1984 | Olson | 310/156 |

Primary Examiner—Steven L. Stephan
Assistant Examiner—Edward H. To
Attorney, Agent, or Firm—Wood, Phillips, Mason, Recktenwald & Van Santen

[57] ABSTRACT

A permanent magnet coupling including a rotatable inner member 32, and outer member 12 rotatable about the same axis 14 as the inner member 32, a plurality of magnets 36 each having a nominally trapezoidal cross section, and a plurality of interpole members 34 each having a nominally trapezoidal cross section. The interpole members 34 are disposed circumferentially between adjacent magnets 36. The major bases 38 of the magnets 36 are located on the sleeve-like cylindrically-shaped iron core 16 of the inner member 32. In operation, the side surfaces 48,50 of the permanent magnets 36 wedge between the side surfaces 42 of the interpole members 34 by centrifugal force. This, in turn, prevents the magnets 36 from moving under static or dynamic conditions. Thus, the interpole members 34 restrain the magnets 36 in a similar fashion as the containment ring 30 generally without requiring a containment ring 30.

11 Claims, 2 Drawing Sheets

RADIAL MAGNETIC COUPLING

FIELD OF THE INVENTION

This invention relates to permanent magnet couplings, and more particularly, to a means by which the magnetic air gap of a permanent magnet coupling can be reduced to provide maximum torque transmission to weight ratio.

BACKGROUND OF THE INVENTION

Present aerospace drive systems which rely on mechanical devices for torque transmission have a few drawbacks. Mechanical failures can occur due to torque overloads and the driven component cannot be isolated from the drive system. Magnetic couplings, on the other hand, provide torque transmission without mechanical contact and losses. Magnetic couplings are especially well suited for use in isolated drive systems because they eliminate the problems associated with rotating shaft seals, namely, inherent leakage and friction. A magnetic coupling also will slip when excessive torque occurs, thus preventing mechanical failure from the torque overloads.

One type of magnetic coupling, a radial type permanent magnet coupling, is made up of an inner and an outer member which are rotatable with respect to one another. Each member includes a cylindrically shaped iron core with magnets mounted to one of its surfaces. Typically, the magnets have a radial direction of magnetization. In general, a containment ring is placed over the magnets located at the outer surface of the inner member, to contain the permanent magnets against centrifugal force during rotation. The radial thickness of the containment ring is dictated by the maximum operating speed of the magnetic coupling and increases as a function of speed. The radial distance between the inner and outer magnets mounted on the inner and outer member, defines the "magnetic" air gap. An increase in the "magnetic" air gap causes a proportional decrease in the magnetic flux that flows between the inner and the outer members. With a decrease in flux, the coupling will transmit less torque because torque transmission is proportional to the squared value of the magnetic flux. Since the containment ring is located between the inner and outer magnets, an increase in the size of the containment ring causes a decrease in the torque transmission capability. In the case of high speed applications, such as aircraft cooling systems utilizing magnetic couplings within turbo compressors, the containment ring becomes prohibitively thick, thus limiting the application of magnetic couplings.

The present invention is directed at reducing the physical size of the coupling by eliminating the containment ring or by keeping its radial thickness to a minimum. That, in turn, will decrease the "magnetic" air gap which, in turn, will allow a coupling of a given size to transmit more torque.

SUMMARY OF THE INVENTION

It is the principal object of the invention to provide a new and improved permanent magnetic coupling. More specifically, it is an object of the invention to provide a magnetic coupling utilizing interpoles disposed circumferentially between adjacent magnets. The magnets are shaped to be wedged radially inward by the interpoles to withstand centrifugal force and reduce the size of, or eliminate the need for, a containment ring in the air gap. This, in turn, allows the reduction of the size of the air gap to increase the coupling efficiency and/or decrease the size of the overall apparatus.

An exemplary embodiment of the invention achieves the foregoing objects in a structure including a rotatable inner member, an outer member rotatable about the same axis as the inner member, a plurality of magnets each having a nominally trapezoidal cross section, and a plurality of interpole members each having a nominally trapezoidal cross section. The interpole members are disposed circumferentially between adjacent magnets and the major bases of the magnets and the minor bases of the interpole members are located radially inward on the inner member. In operation, the sides of the permanent magnets wedge between the interpole members by centrifugal force. This in turn prevents the magnets from moving under static or dynamic conditions. Thus, the interpole members contain the magnets in a similar fashion as the containment ring, but generally without occupying the "magnetic" air gap.

In some cases, the containment ring may still be utilized if the stress on the coupling exceeds the mechanical properties of the interpole members. Because the interpole members reduce the effective stress placed on the containment ring, the thickness of the containment ring can be substantially reduced to achieve improved efficiency. In this mode, the mechanical stress is distributed among the interpoles as well as the containment ring.

Other objects and advantages will become apparent from the following specification taken in connection with the accompanying drawings.

DESCRIPTION OF THE PRIOR ART

Figure 1:
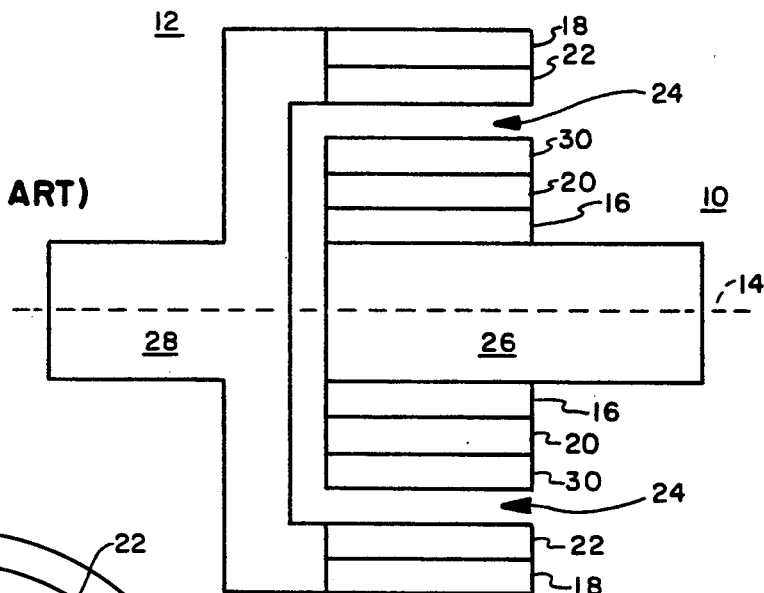
FIG. 1 is a fragmentary, sectional view of a prior art permanent magnet coupling.
Figure 2:
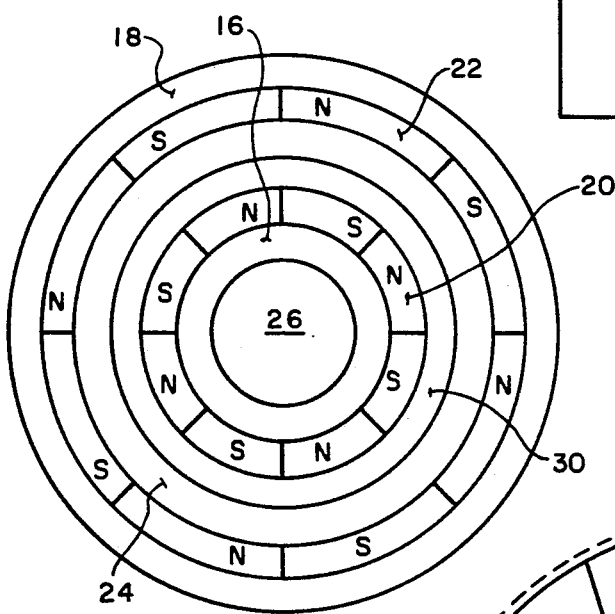
FIG. 2 is a side view of FIG. 1.

FIGS. 1 and 2 show a prior art permanent magnet coupling made of an inner member 10 and an outer member 12. Both are journalled for rotation about a common axis 14 by bearings (not shown). Each member includes a sleeve-like cylindrically-shaped iron core 16, 18 with magnets 20, 22 mounted to one of its surfaces. Typically, the inner member 10 is the driving member and the outer member 12 is the driven member. The magnets 20 on the inner member 10 transmit magnetic flux in a "magnetic" air gap 24 to the magnets 22 on the outer member 12. As the inner member 10 rotates, the magnetic flux in the "magnetic" air gap 24 magnetically attracts the aligned magnets 22 with opposite polarity on the outer member 12 to cause the same to rotate.

The outer member 12 has the magnets 22 mounted on its radially inward side. Typically, a shaft 26 is connected to the driving component and a shaft 28 is connected to the driven component. In general, a containment ring 30 is placed over the magnets 20, located on the outer surface of the inner member 10, to contain the permanent magnets 20 thereon during rotation against the centrifugal force that tends to move the magnets 20 radially outward. The radial thickness of the containment ring 30 is dictated by the maximum operating speed of the magnetic coupling. The required radial thickness increases as a squared function of speed. Thus, to accommodate higher angular velocities, the thickness of the containment ring 30 must be increased. This in turn increases the "magnetic" air gap 24, that is, the distance between adjacent poles of the magnets 20 and the magnets 22. Increasing the "magnetic" air gap 24, in turn, decreases the magnetic flux that flows between the inner member 10 and the outer member 12. Consequently, the coupling will transmit less torque since torque is proportional to the squared value of the magnetic flux. Conversely, reducing the radial thickness of the containment ring 30 increases the effective amount of flux transmitted from the inner member 10 to the outer member 12. In the case of high speed applications, the containment ring 30 becomes prohibitively thick and limits the application of the coupling.

DESCRIPTION OF THE PREFERRED EMBODIMENT

The present invention reduces the physical size of the coupling by eliminating the containment ring or by reducing its radial thickness to a minimum. The coupling of the present invention includes an inner member 32 and a conventional outer member, such as the member 12. The outer member 12 is as previously described and in the interest of brevity that description will not be repeated. The outer member 12 may also have a design similar to the inner member 32 of the present invention. The inner member 32 includes interpole members 34, a sleeve-like cylindrically-shaped iron core 16, magnets 36, and a shaft 26. The reduction of the "magnetic" air gap 24 may be accomplished with the use of interpole members 34 placed in alternating fashion between the magnets 36 on the inner member 32, depicted in FIGS. 3,4.

Both the interpole members 34 and the magnets 36 have nominally trapezoidal cross sections. The interpole members 34 and the magnets 36 do not have true trapezoidal cross sections because, as will be readily appreciated, their minor bases are arcuate rather than straight lines. The shape of the major bases may be arcuate or straight lines. However, since the same do approach trapezoidal cross sections, they will be referred to in that fashion.

The interpole members 34 include minor bases 38 which are located radially inward and major bases 40 which are located radially outward. The bases 38 and 40 are interconnected by side surfaces 42, preferably of equal length.

Conversely, the major bases 44 of the magnets 36 are located radially inward while the minor bases 46 of the magnets 36 are located radially outward. The two are connected by side surfaces 48,50 which are of a configuration to complement the side surfaces 42 of the adjacent interpole members 34.

Figure 4:
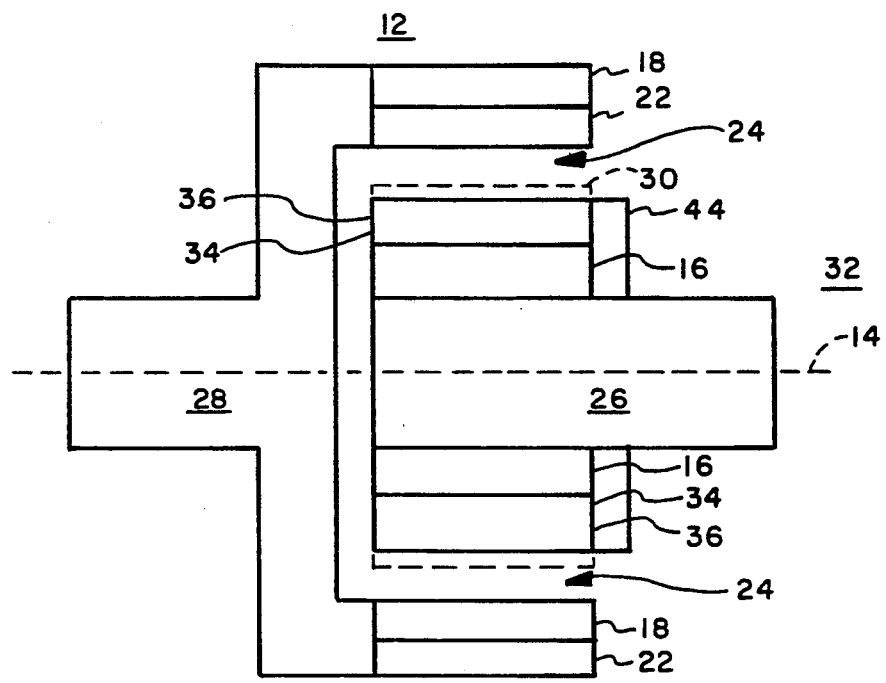
FIG. 4 is a fragmentary sectional view of the permanent magnet coupling of the present invention and includes a side view of the inner member of FIG. 3.

The interpole members 34 may be mounted on the iron core by any suitable means. Alternatively, the interpole members 34 can be mounted, by any suitable means, on one side 52 of a circular disk 54 which in turn is coaxial to and mounted onto the shaft 26 as best seen in FIG. 4. The magnets 36, in turn, are merely slipped into the spaces adjacent interpole members 34 prior to the disposition of the core 16 on the shaft 26. That is to say, that the magnets 36 are moved along the shaft 26 in close adjacency thereto and radially inward of the interpole members 34. The magnets 36 are then introduced into the area between adjacent interpole members 34. Thereafter, the core 16 may be placed on the shaft 26. The outer surface 56 of the core will then be in abutment with major bases 44 of the magnets 36 to prevent the magnets 36 from moving radially inward and out of the slots between the adjacent interpoles 36.

Figure 3:
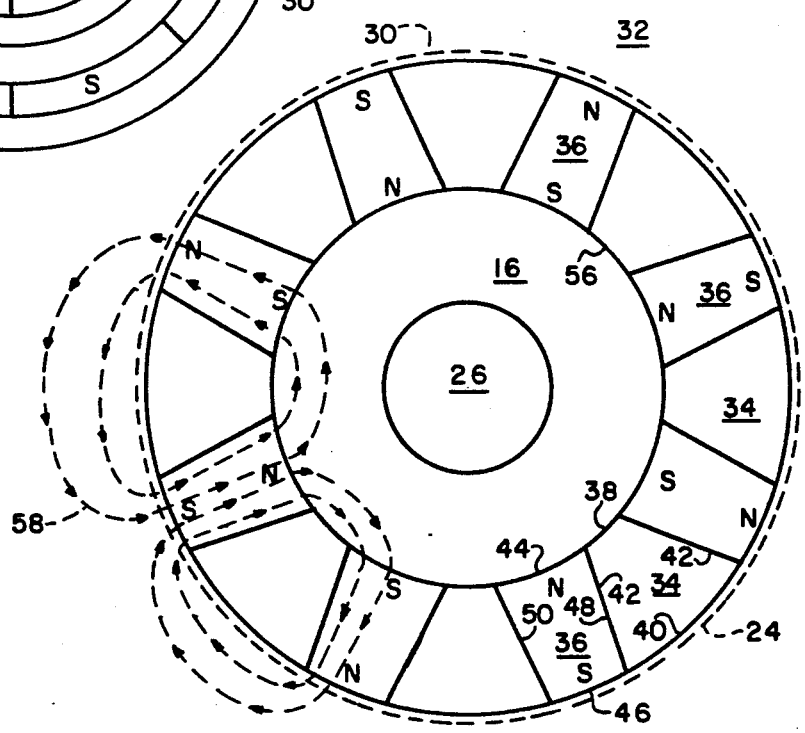
FIG. 3 is a view similar to FIG. 2, but of a permanent magnetic coupling made according to the invention and specifically the inner member thereof.

FIG. 3 illustrates the general configuration of the resulting assembly from the standpoint of achieving the desired interaction between the side surfaces 42 of the interpoles 34 and the side surfaces 48,50 of the magnets 36. It will be readily appreciated that since the interpoles 34 are fixed, the magnets 36 are movable and the minor bases 46 of the magnet 36 are located radially outward, upon rotation of the rotor shaft 26, centrifugal force will act on the various components. While the interpoles 34 will be held in place by their mounting on the disk 54 and the use of a containment ring 30, if any, the magnets 36 are not so restrained. They will tend to move radially outward and firmly wedge between adjacent interpoles 34. Through this wedging action, radial restraint or containment of the magnets 36 is provided by the interpoles 34 either entirely or at least in major part if a containment ring 30 is to be used. As a consequence of this construction, the thickness of the containment ring 30 may be minimized or eliminated altogether which allows the air gap to be reduced and, in turn, increases the magnetic flux across the same. This, of course, results in an increase in the torque that can be transmitted by the coupling.

In the embodiment illustrated in FIG. 3, the poles of the magnets 36 are arranged radially. That is to say, for any given magnet 36, one of the poles is located radially innermost at the major base 44 while the opposite pole is located radially outermost at the minor base 46. The polarity of the inner poles as well as the outer poles is alternated as illustrated in FIG. 3.

The interpole members 34 are made of non-magnetic materials which do not conduct a flux 58 generated by the alternating poles of the magnets 36 adjacent to the interpole member 34. The flux 58 generated by the inner member 32 magnetically links with the flux (not shown) generated on the outer member 12. Flux linkage in magnetic couplings is known in the art and, in the interest of brevity, will not be described. As the driving member (inner member 32) rotates due to torque on the shaft 26, the flux 58 generated on the inner member 32 by the magnets 36 magnetically links with the flux (not shown) generated by aligned magnets 22 on the driven member (outer member 12). If the torque input exceeds the magnetic attraction between the driving and driven members, the driving member will slip inside the driven member and prevent mechanical failure. Because there is no mechanical contact, the high frictional temperatures and leakage problems normally associated with couplings at the interface between the driving and driven member are eliminated.

Figure 5:
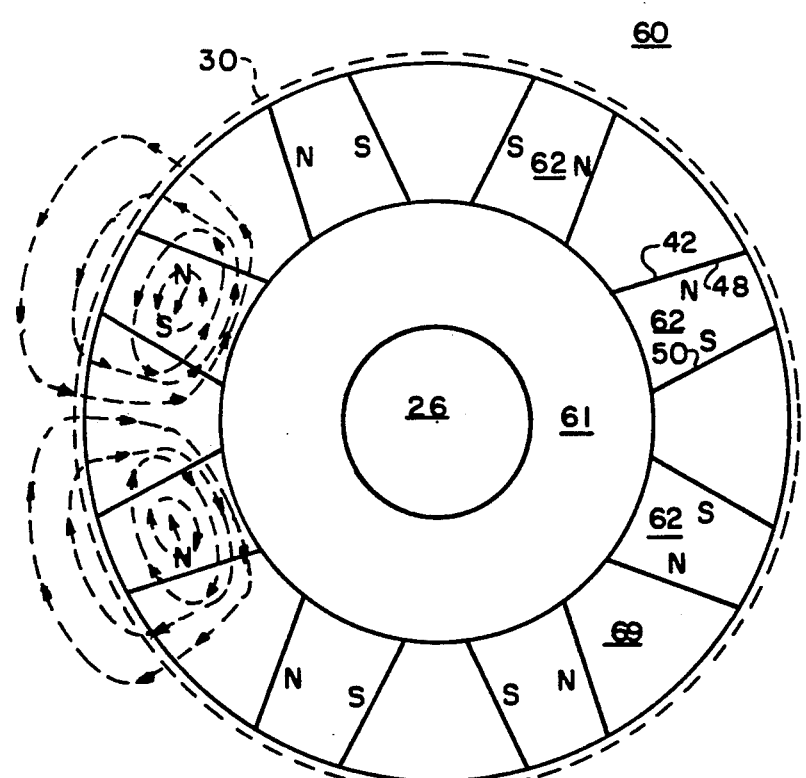
FIG. 5 is a view similar to FIG. 3 but of a modified embodiment of the invention.

In FIG. 5, an alternative design has been illustrated. The inner member 60 of the embodiment of FIG. 5 includes a non-magnetic steel core 61, a shaft 26, magnets 62 in lieu of the magnets 36 and interpole members 63. The interpole members 63 are mounted on the steel core 61 by any suitable method. A disk 54 is not used for mounting the interpole members 63. The interpole members 63 and magnets 62 have the same substantially trapezoidal cross section and mounting as corresponding components described in reference to FIGS. 3, 4. However, in the embodiment illustrated in FIG. 5, the poles of the magnets 62 are arranged circumferentially and the interpole members 63 are made of magnetic materials which conduct a flux 64. In other words, the poles of magnets 62 have effectively been rotated 90° in relation to the magnets 36 of FIG. 3. That is to say, for any given magnet 62, one of the poles is located on the side surface 48 of the magnet 62 adjacent to the side surface 42 of one interpole member 63, while the opposite pole is located on the opposite side surface 50 of magnet 62 adjacent to the side surface 42 of another interpole member 63. The polarity of the poles on adjacent magnets is alternated as illustrated in FIG. 5.

In the alternate design of FIG. 5, the flux 64 is generated by the magnets 62 and conducted by the magnetic interpole members 63. The flux 64 magnetically links the rotation of the inner member 60 to the outer member 12, driving the outer member 12.

In both inner member designs shown in FIGS. 3 and 5, a containment ring 30 may be utilized in high speed applications where the mechanical stress of rotation exceeds the restraint provided by the interpole members 34,63.

As a result of the reduction in the "magnetic" air gap, the effective flux transmitted between the inner and outer member is increased and, in the case where the containment ring is eliminated, the maximum power to weight ratio is achieved.

I claim:

1. A permanent magnet coupling having:
   an outer member with a plurality of permanent magnets mounted on its inner surface;
   an inner member having a radius and lying within said outer member;
   a plurality of interpole members circumferentially disposed on the inner member in proximity to said outer member and defining gaps having an inner boundary and an outer boundary wherein the length of the inner boundary is greater than the outer boundary; and
   a plurality of permanent magnets each having a north and south pole and wedged into respective ones of the gaps defined by the interpole members.

2. The permanent magnet coupling of claim 1 wherein the north and south poles of the magnets wedged into the gaps defined by the interpole members are aligned with the radius of the inner member and wherein the north and south poles alternate about the periphery of the inner member.

3. The permanent magnet coupling of claim 1 wherein the north and south poles of the magnets wedged into the gaps are in circumferentially spaced locations and wherein adjacent poles on adjacent magnets are identical.

4. The permanent magnet coupling of claim 1 wherein the inner and outer members are on coaxial shafts.

5. The permanent magnet coupling of claim 1 wherein the inner member includes a disk having said interpole members mounted thereon.

6. The permanent magnet coupling of claim 4 wherein the north and south poles are aligned along the radius of the shafts and poles of magnets positioned at the inner boundary of the gap alternate about said inner member.

7. The permanent magnet coupling of claim 1 wherein the inner member has a containment means disposed around the radially outwardly facing edge of the interpole members and magnets for restraining the permanent magnets during rotation.

8. A permanent magnet coupling having:
   an outer member with a plurality of magnets mounted on one side thereof;
   an inner member;
   a plurality of circumferentially spaced magnets having a nominally trapezoidal cross section on said inner member; and
   a plurality of interpole members on said inner member having a nominally trapezoidal cross section wherein the interpole members are circumferentially disposed between adjacent magnets and wherein the major base of the magnets and the minor base of the interpole members are positioned on the surface of the inner member.

9. A method of reducing a magnetic air gap of a permanent magnet coupling comprising the steps of:
   providing an inner member having a shaft and a first surface;
   providing a plurality of magnets having a nominally trapezoidal cross section, each magnet having a major and minor base;
   providing a plurality of interpole members having a nominally trapezoidal cross section, each interpole member having a major and minor base;
   positioning the major bases of the magnets on the first surface of the inner member while spacing the magnets about the inner member;
   positioning the interpole members between the magnets and in abutment therewith and with the minor bases of the interpole members on the first surface of the inner member between adjacent magnets.

10. The method of claim 9 also comprising the steps of:
    providing a containment means for retaining the magnets and interpole members during rotation; and
    positioning the containment means on a second surface formed by the major bass of the interpoles and the minor bases of the magnets.

11. The method of claim 9 also comprising the steps of:
    providing a disk means for attaching the interpole members on the first surface of the inner member; and
    positioning the disk means coaxially with the shaft of the inner member.

* * * * *